(12) United States Patent
Czarnek

(10) Patent No.: US 7,434,486 B2
(45) Date of Patent: Oct. 14, 2008

(54) LEAD SCREW BEARING

(75) Inventor: Robert Czarnek, Johnstown, PA (US)

(73) Assignee: Advanced Analytical Technologies, Inc., Ames, IA (US)

(*) Notice: Subject to any disclaimer, the term of this patent is extended or adjusted under 35 U.S.C. 154(b) by 63 days.

(21) Appl. No.: 11/055,737

(22) Filed: Feb. 10, 2005

(65) Prior Publication Data
US 2005/0178224 A1    Aug. 18, 2005

Related U.S. Application Data

(60) Provisional application No. 60/545,235, filed on Feb. 17, 2004.

(51) Int. Cl.
F16H 25/20 (2006.01)
(52) U.S. Cl. ...................... 74/89.37; 74/89.36
(58) Field of Classification Search ............... 74/89.23, 74/89.32, 89.33, 89.36, 89.37; 384/280, 384/281; F16H 25/20, 25/22, 25/24
See application file for complete search history.

(56) References Cited

U.S. PATENT DOCUMENTS

| | | | | |
|---|---|---|---|---|
| 2,985,494 A * | 5/1961 | Terhorst | ...................... | 384/278 |
| 3,203,304 A * | 8/1965 | Rapata | .................... | 411/41 |
| 3,670,583 A * | 6/1972 | Leming | ................. | 74/89.36 |
| 4,023,432 A * | 5/1977 | Killian | ................. | 74/89.36 |
| 4,266,437 A * | 5/1981 | Obergfell | .................. | 74/89.37 |
| 4,643,290 A * | 2/1987 | Metcalf et al. | .............. | 192/141 |
| 4,717,268 A * | 1/1988 | Orkin | .................... | 384/280 |
| 6,419,062 B1 * | 7/2002 | Crowe | .................... | 192/52.6 |
| 2003/0089826 A1 * | 5/2003 | Barba | ..................... | 244/129.1 |
| 2004/0251239 A1 * | 12/2004 | Hochhalter et al. | ........ | 219/86.1 |

* cited by examiner

*Primary Examiner*—Richard W L Ridley
*Assistant Examiner*—Terence Boes
(74) *Attorney, Agent, or Firm*—The Webb Law Firm

(57) ABSTRACT

A bearing assembly includes a housing having a substantially round throughbore, a first side, and a second side. A sleeve bearing is situated within the throughbore. A first spring washer is situated adjacent the first side of the housing and the sleeve bearing, and similarly, a second spring washer is situated adjacent the second side of the housing and the sleeve bearing. A bushing extends into an opening of the first spring washer, an opening of the sleeve bearing, and the throughbore of the housing. A thrust washer is situated adjacent to the second spring washer and a fastener is situated adjacent to the thrust washer. A kit including the aforementioned components is also disclosed.

4 Claims, 4 Drawing Sheets

LEAD SCREW BEARING

CROSS REFERENCE TO RELATED APPLICATIONS

This application claims the benefit of U.S. Provisional patent application No. 60/545,235, filed Feb. 17, 2004, and entitled "Lead Screw Bearing", the contents of which are incorporated herein by reference.

BACKGROUND OF THE INVENTION

1. Field of the Invention

The present invention is directed to a bearing assembly and, more specifically, to an improved, compact, and inexpensive lead screw or ball screw bearing assembly.

2. Description of Related Art

Linear actuators in mechanical systems, such as robotic systems, require appropriate mechanical components to convert rotational motion into linear motion. Presently, such systems utilize one or more lead screws or ball screws to achieve this motion. Each such screw is typically supported in one of two ways, namely, either by at least one individual bearing situated on each end of the screws, or by an individual bearing on an end of the screw with a nut on a corresponding carriage associated with the screw. In either case, the bearing supporting the screw must include a combination of one or more radial bearings and one or more thrust bearings. These bearing elements form either a lead screw or ball screw assembly. In order to minimize axial play of either type of screw and therefore resultant positioning error of the linear actuator, the lead screw or ball screw assembly must be designed with minimum clearances or be preloaded. Therefore, a design incorporating the aforementioned bearing elements is a complex, bulky, and an expensive mechanism to implement.

It is, therefore, desirable to overcome the above problems and others by providing a lead screw or ball screw bearing assembly that is more efficient, compact, and inexpensive as compared to lead screw or ball screw assemblies presently known in the art.

SUMMARY OF THE INVENTION

Accordingly, I have invented a bearing assembly including a housing having a substantially round throughbore, a first side, and a second side. The first side includes a first recessed portion and the second side includes a second recessed portion. A sleeve bearing is situated within the throughbore. A first spring washer is situated at least partially within the first recessed portion and is adjacent to the sleeve bearing, and similarly, a second spring washer is situated at least partially within the second recessed portion and adjacent to the sleeve bearing. A bushing extends into an opening of the first spring washer, an opening of the sleeve bearing, and the throughbore of the housing. A thrust washer is situated adjacent to the second spring washer and a nut is situated adjacent to the thrust washer. A kit including the aforementioned components is also disclosed.

The lead screw bearing assembly is designed to provide zero axial play and is self-compensating for any axial wear. The lead screw bearing assembly of the present invention is ideally suited for applications where high-speed and large loads are not critical. Additionally, the lead screw bearing assembly may be utilized without lubrication and is therefore practical for clean room, medical and food industry applications. It is to be understood that the aforementioned environmental operating conditions are not to be construed as limiting the use of the present invention. Additionally, the inherent design of the lead screw bearing assembly does not require adjustment during the assembly process, even if generous manufacturing tolerances are attributed to the any of the component parts of the lead screw bearing assembly.

It is to be understood that although the present invention is described hereinafter in the context of lead screws, other types of screws may be equally utilized or adapted to function with the bearing assembly. For example, various sliding contact screws or rolling contact screws may be used. Exemplary sliding contact screws include, but are not limited to triangular thread screws and Acme thread lead screws. Exemplary rolling contact screws include, but are not limited to ball screws and roller screws. Additionally, other suitable rotary shafts may be used.

Still other desirable features of the invention will become apparent to those of ordinary skill in the art upon reading and understanding the following detailed description, taken with the accompanying drawings, wherein like reference numerals represent like elements throughout.

DETAILED DESCRIPTION OF THE INVENTION

Figure 1:
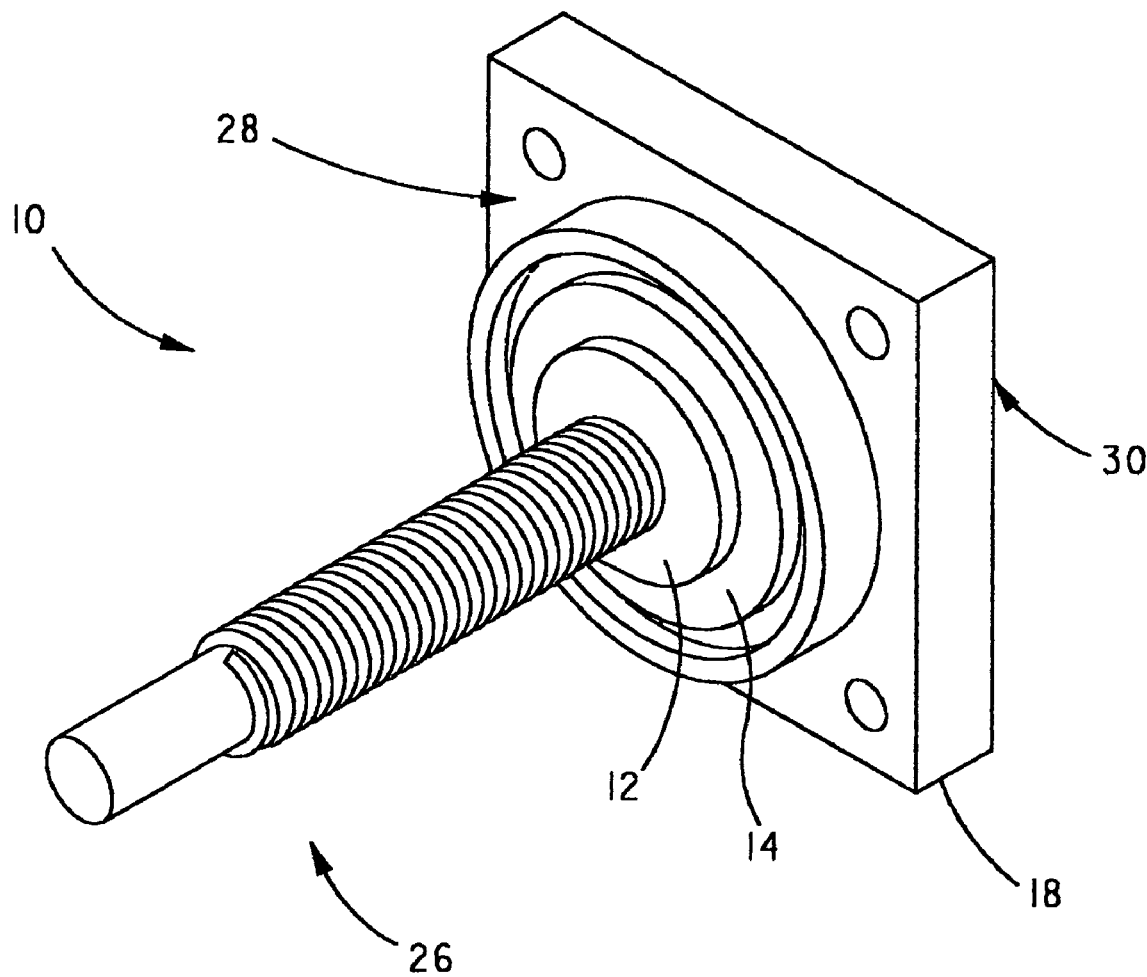
FIG. 1 is perspective view of a lead screw bearing assembly in accordance with the present invention.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific apparatus illustrated in the attached drawings, and described in the following specification, is simply an exemplary embodiment of the invention. Hence, specific dimensions and other physical characteristics related to the embodiments disclosed herein are not to be considered as limiting.

Figure 2:
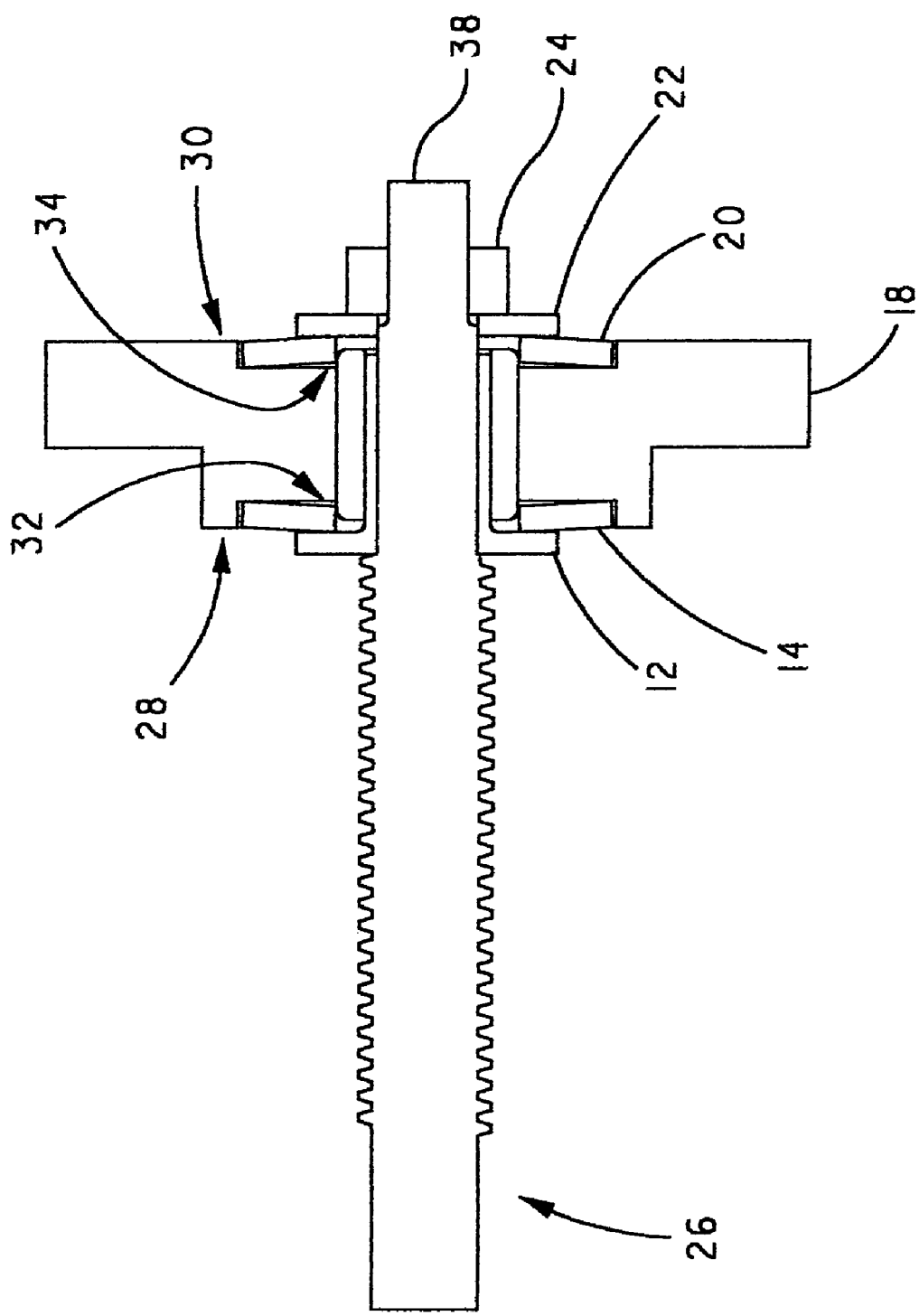
FIG. 2 is a cross-sectional side view of the lead screw bearing assembly of FIG. 1 in accordance with the present invention.
Figure 3:
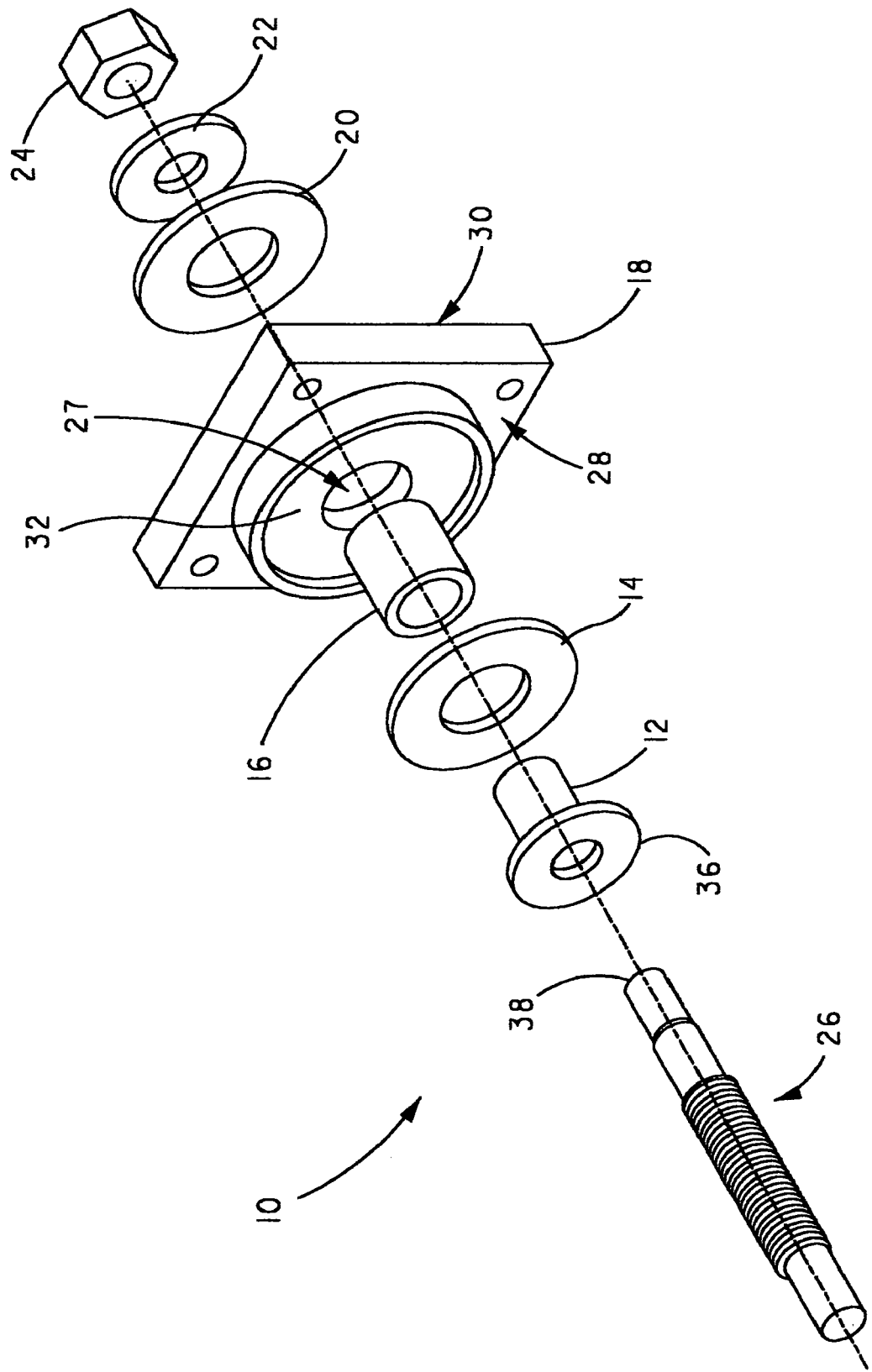
FIG. 3 is an exploded perspective view of the lead screw bearing assembly of FIG. 1 in accordance with the present invention.
Figure 4:
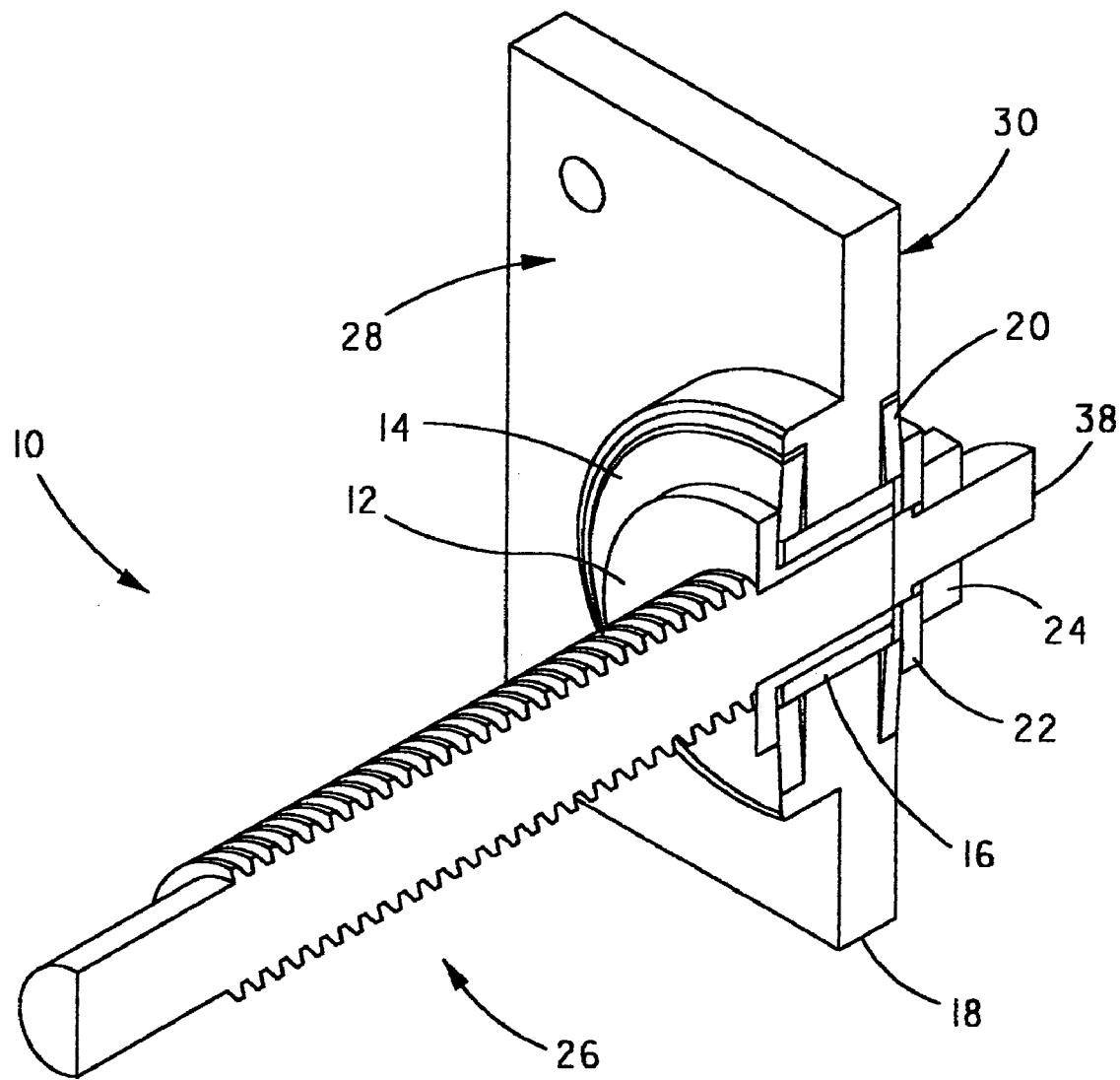
FIG. 4 is a cross-sectional perspective view of the lead screw bearing assembly of FIG. 1 in accordance with the present invention.

FIGS. 1-4 show a lead screw bearing assembly 10 that includes a bushing 12, a first spring washer 14, a sleeve bearing 16, a housing 18, a second spring washer 20, a thrust washer 22, and a nut 24. A lead screw 26 may be accommodated within lead screw bearing assembly 10. For exemplary purposes, the present invention will be discussed in conjunction with a lead screw, however, it is to be understood that any suitable screw for converting rotational motion into linear motion may be substituted for the lead screw. This bearing can also be used for rotating shafts alone, without any conversion of rotational motion to linear motion.

In the desirable embodiment of lead screw bearing assembly 10, housing 18 may be designed as a multifunctional attachable flange, however, it is to be understood that housing 18 may be embodied by any other suitable end block configuration depending upon the application of lead screw bearing assembly 10. Desirably, housing 18 includes a round throughbore 27 extending from a first side 28 to a second side 30 of housing 18. Housing 18 may include recessed portions 32, 34 on first side 28 and second side 30, respectively. As shown in the figures, desirably, recessed portions 32, 34 are equidistantly formed around the axis of throughbore 27, however, this is not to be construed as limiting the size and dimension of each of recessed portions 32, 34 as they relate to housing 18. Housing 18 may be constructed of any suitable material in relation to the application in which lead screw bearing assembly 10 is intended to function. An exemplary material that is sufficiently sturdy and immune to corrosion is aluminum.

Sleeve bearing 16 is sufficiently sized to fit the diameter of throughbore 27 and, more specifically, sleeve bearing 16 may be sized so that a friction or press fit results between throughbore 27 and sleeve bearing 16. Sleeve bearing 16 may be constructed of any suitable material including, but not limited to maintenance free polymeric material. One such polymeric sleeve bearing is manufactured by Igus, Inc.

In the desirable embodiment, lead screw bearing assembly 10 includes first spring washer 14 and second spring washer 20 situated at least partially within respective recessed portions 32, 34 of housing 18. First and second spring washers 14, 20 may be constructed of any suitable material including, but not limited to polymeric material. An exemplary polymeric spring washer is manufactured under the Polysorb brand name by Igus, Inc. As shown in detail in FIG. 2, spring washers 14, 20 are situated within recessed portions 32, 34 such that any force imparted on spring washers 14, 20 would result in the resultant potential energy stored therein to be directed away from housing 18. It is to be understood that first and second spring washers 14, 20 are considered in the broadest sense as elastic washers, and therefore it is to be understood that any other suitable elastic washers able to store and return accumulated potential energy may be substituted for first and second spring washers 14, 20. If desired, one of first and second spring washers 14, 20 may be a thrust washer instead of a spring washer.

Lead screw bearing assembly 10 also includes bushing 12 inserted through first spring washer 14 and into sleeve bearing 16. The inner diameter of bushing 12 defines the area into which lead screw 26 is to be received. Bushing 12 includes a circumferential lip 36 sufficiently sized to cover a surface area of first spring washer 14 so that any force imparted on circumferential lip 36 by lead screw 26 is transferred to first spring washer 14. Bushing 12 may be constructed of any suitable material including, but not limited to stainless steel.

Thrust washer 22 is situated adjacent to second spring washer 20. Desirably, thrust washer 22 is sufficiently sized to cover a surface area of second spring washer 20 so that any force imparted on circumferential lip 36 by nut 24 is transferred to second spring washer 20. Thrust washer 22 may be constructed of any suitable material including, but not limited to stainless steel.

It is to be understood that the aforementioned mechanical elements, including first spring washer 14, sleeve bearing 16, housing 18, second spring washer 20, and thrust washer 22 inherently have openings for receiving lead screw 26 therethrough. The respective openings of first spring washer 14, sleeve bearing 16, second spring washer 20, and thrust washer 22 are substantially axially aligned with the axis of throughbore 27.

The aforementioned mechanical elements are intended to provide the desirable construction of lead screw bearing assembly 10, however it is to be understood that other mechanical elements may be substituted to provide the same functionality of lead screw bearing assembly 10. Desirably, lead screw bearing assembly 10 is utilized in conjunction with lead screw 26. Specifically, an end 38 of lead screw 26 is inserted from first side 28 of housing 18, through throughbore 27, and out of second side 30 of housing 18. Thereafter, a fastener may be attached to end 38 of lead screw 26 to secure lead screw 26 to lead screw bearing assembly 10. In an exemplary embodiment, end 38 and nut 24 are threaded to provide threaded engagement thereof. However, it is to be understood that other fasteners and fastening connections may be utilized to secure lead screw 26 to lead screw bearing assembly 10. It is also to be understood that one or more lead screw bearing assemblies 10 may be installed and utilized with lead screw 26. Specifically, each end of lead screw 26 may be secured to a respective lead screw bearing assembly 10.

In operation, the combination of sleeve 16 and bushing 12 of lead screw bearing assembly 10 acts as a type of sleeve bearing to support any radial loads. First and second spring washers 14, 20 act as thrust bearings to support any axial loads. The elasticity inherent in first and second spring washers 14, 20 allows lead screw bearing assembly 10 to eliminate axial play as well as provide an axial preload to lead screw 26.

The aforementioned design of lead screw bearing assembly 10 is ideally suited for horizontal orientation operation where forces are exerted in both horizontal directions. However, in vertical orientation operations, such as those associated with stages where lead screw supports a load in only one direction, the design may be appropriately modified. Specifically, if lead screw bearing assembly 10 is situated beneath the load, then second spring washer 20 (i.e., the lower of the first and second spring washers in the vertical orientation) may be substituted with a flat washer, desirably made of the same material as, without limitation, spring washer 14. It is to be understood that the aforementioned horizontal or vertical operations of lead screw bearing assembly 10 are not to be construed as limiting the invention, as lead screw bearing assembly 10 may be utilized in any number of orientations. Accordingly, lead screw bearing assembly 10 may be modified as necessary.

The invention has been described with reference to the desirable embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A bearing assembly comprising:
   (a) a housing having a substantially round throughbore, the housing further having a first side and a second side;
   (b) a sleeve bearing situated within the throughbore, wherein the sleeve bearing includes an opening;
   (c) a first spring washer adjoining the first side of the housing and situated adjacent one end of the sleeve bearing, wherein the first spring washer includes an opening extending therethrough;
   (d) a second spring washer adjoining the second side of the housing and situated adjacent another end of the sleeve bearing, wherein the second spring washer includes an opening extending therethrough;
   (e) a bushing having an opening extending therethrough, wherein the bushing extends into the opening of the first spring washer, the opening of the sleeve bearing, and the throughbore of the housing;
   (f) a thrust washer adjoining the second spring washer, wherein the thrust washer includes an opening extending therethrough; and
   (g) a rotary shaft rotatably received within the bushing, wherein the rotary shaft is a lead screw or a ball screw.

2. The bearing assembly of claim 1, further comprising a fastener situated adjacent to the thrust washer.

3. The bearing assembly of claim 2, wherein the fastener is threadably engaged to an end of the rotary shaft.

4. The bearing assembly of claim 1, wherein at least one of the first spring washer and the second spring washer is constructed of a polymeric elastic material.

* * * * *